J. CLARK.
COTTON PLANTER.
APPLICATION FILED JULY 22, 1909.

947,884.

Patented Feb. 1, 1910.
4 SHEETS—SHEET 3.

Witnesses
James F. Crown
E. M. Ricketts

Inventor
John Clark
By Watson E. Coleman
Attorney

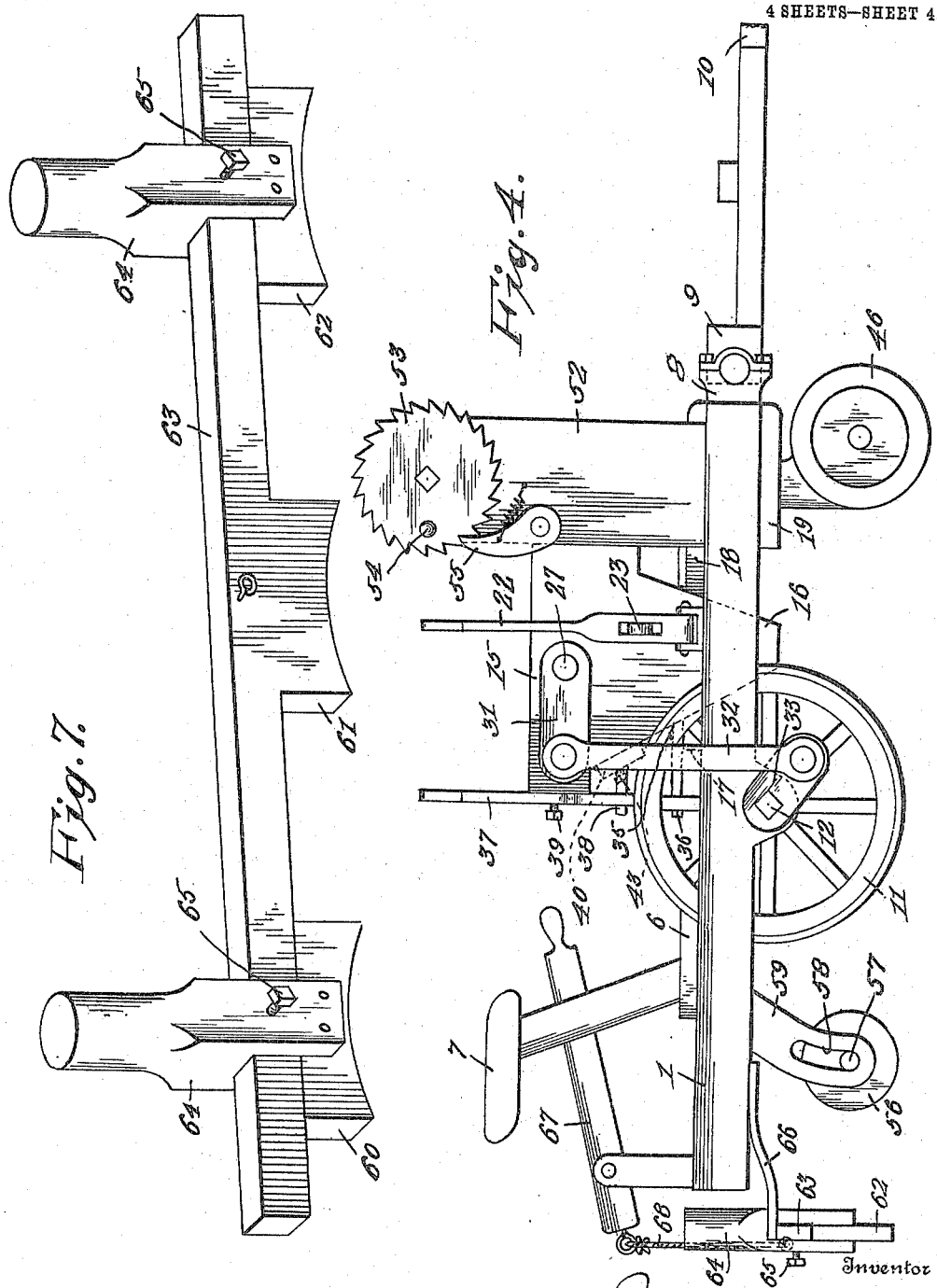

UNITED STATES PATENT OFFICE.

JOHN CLARK, OF MOUNT JULIET, TENNESSEE.

COTTON-PLANTER.

947,884. Specification of Letters Patent. Patented Feb. 1, 1910.

Application filed July 22, 1909. Serial No. 508,992.

*To all whom it may concern:*

Be it known that I, JOHN CLARK, a citizen of the United States, residing at Mount Juliet, in the county of Wilson and State of Tennessee, have invented certain new and useful Improvements in Cotton-Planters, of which the following is a specification, reference being had to the accompanying drawings.

This invention relates to improvements in cotton planters and more particularly one adapted for simultaneously planting two or more rows of cotton seed.

The objects of the invention are to provide a simple and practical machine of this character having means whereby two or more rows of cotton seed may be planted at different distances from each other, improved means for simultaneously adjusting the furrow opening devices and the seed dropping mechanisms toward and from each other and improved adjustable furrow closing scrapers.

With the above and other objects in view, the invention consists of the novel features of construction and the combination and arrangement of parts hereinafter fully described and claimed, and illustrated in the accompanying drawings, in which—

Figure 1:
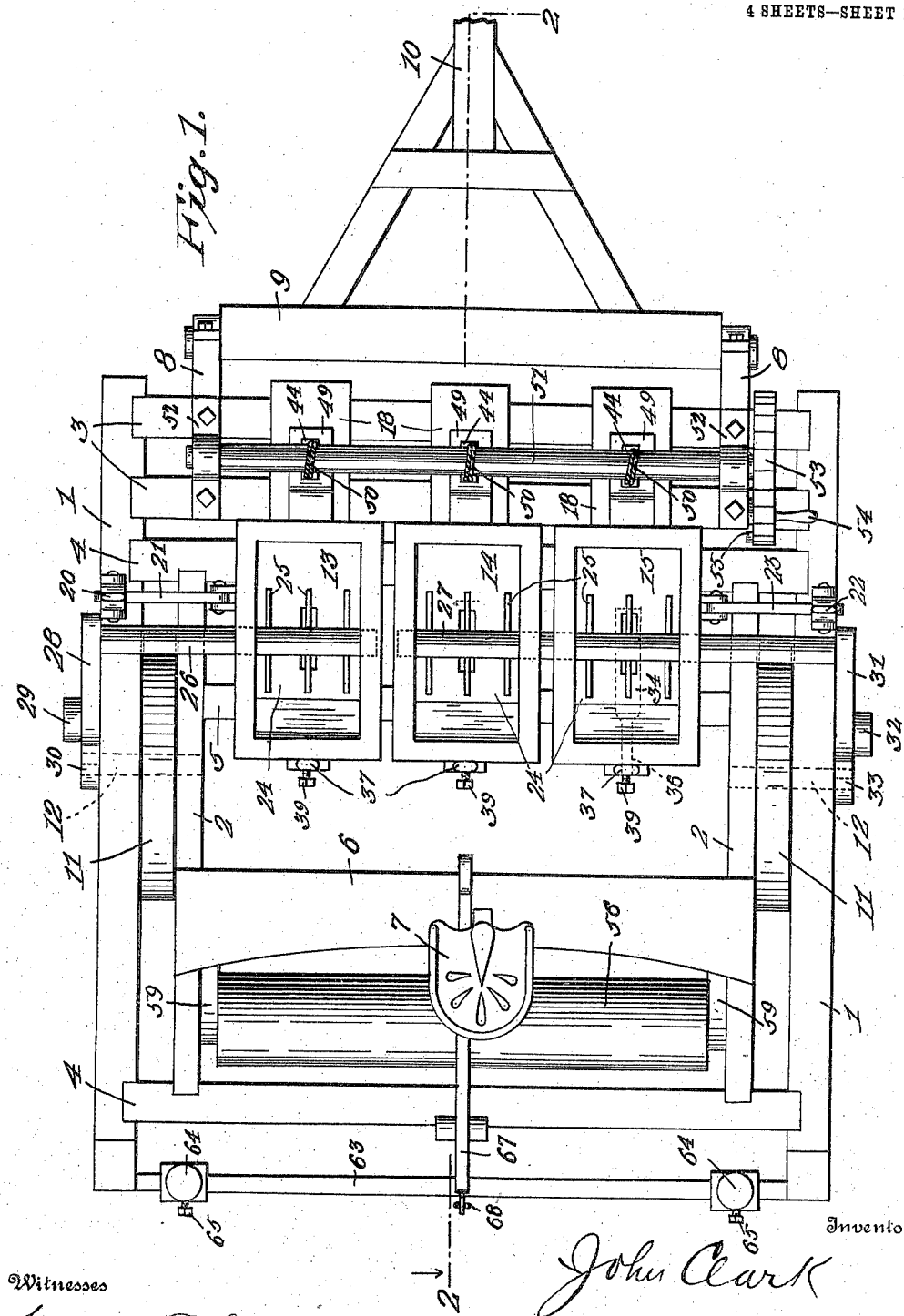
Figure 2:
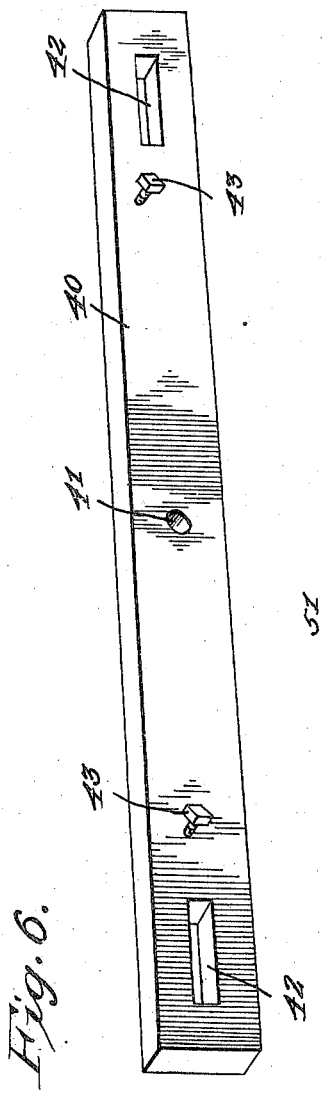
Figure 3:
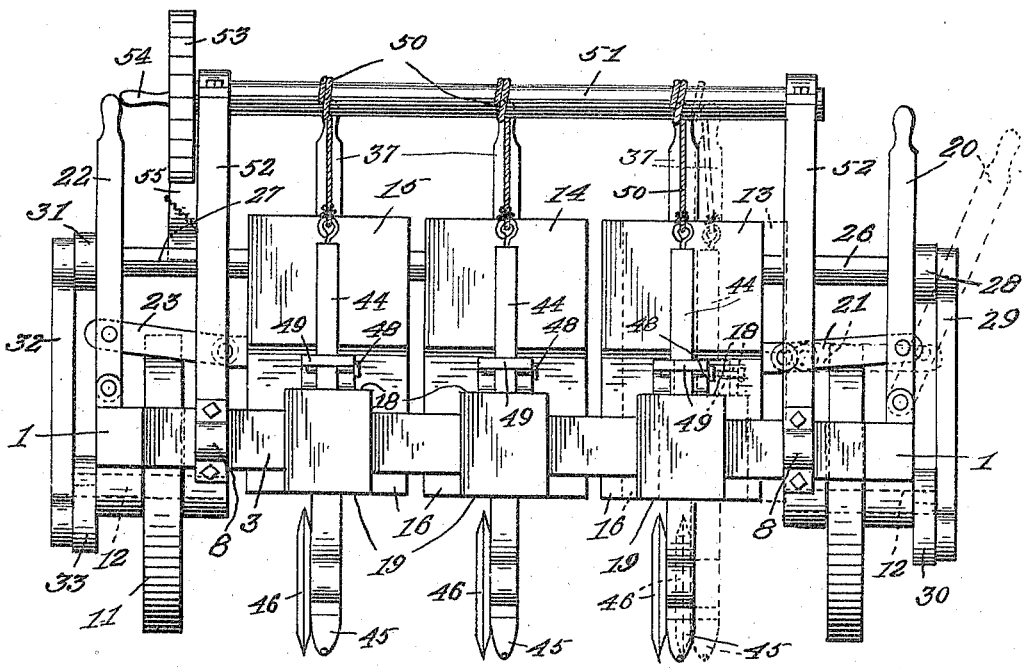
Figure 5:
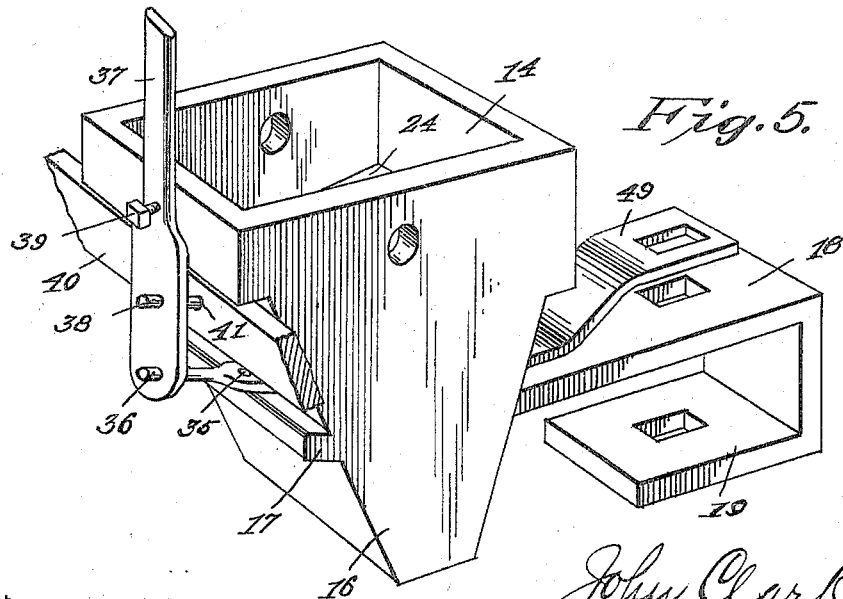

Figure 1 is a plan view of the improved three row cotton planter; Fig. 2 is a vertical longitudinal sectional view taken on the plane indicated by the line 2—2 in Fig. 1; Fig. 3 is a front elevation with the draft tongue removed; Fig. 4 is a side elevation; Fig. 5 is a detail perspective view of one of the side hoppers; Fig. 6 is a similar view of the connecting bar by means of which the hoppers are secured in adjusted position and Fig. 7 is a perspective view of the adjustable furrow closing scrapers.

The main frame of the machine consists of two outer side beams 1, two inner side beams 2 and two pairs of connecting bars 3, 3, 4, 4. The ends of the bars 3, 4 are secured to the beams 1 and the ends of the beams 2 are secured to the bars 4. The beams 2 are further united by a connecting bar 5 and by a platform bar or plank 6. The latter has mounted upon it a driver's seat 7 and the front connecting bars 3 have secured to and projecting forwardly from them bearings 8 for the pivots of the rear cross bar 9 of the draft tongue 10. Arranged between the beams 1, 2 are supporting and drive wheels 11 which are fixed to axles 12 journaled in suitable bearings on said beams.

In the preferred embodiment of the invention three seed hoppers 13, 14, 15 are mounted on the main frame, the intermediate hopper 14 being stationary and the two end hoppers 13, 15 being laterally adjustable on the frame toward and from the intermediate one. Each of these hoppers consists of an upper portion or body having a reduced or tapered lower end 16 which projects between the front connecting bar 4 and the bar 5. Said tapered or funnel-shaped lower end 16 of the hopper is provided at its rear with a supporting rib 17 which rests and slides upon the bar 5 and upon its front with a forwardly projecting arm 18 which rests and slides upon the bars 4, and has a downwardly and rearwardly turned portion 19 surrounding said bars 3. The hopper 13 is adjusted by means of an upright hand lever 20 pivoted at its lower end on one of the beams 1 and connected by a link 21 to the outer side of said hopper 13. The hopper 15 is similarly adjusted by a similar hand lever 22 and a connecting link 23, as clearly shown in Fig. 3 of the drawings. In each of said hoppers is arranged an apertured or slotted bottom plate 24 through the opening of which the cotton seed is adapted to be forced by agitator fingers or teeth 25 projecting radially from one of two rock shafts 26, 27. The rock shaft 26 is loosely journaled for a limited siding as well as oscillatory movement in the side walls of the hopper 13 and its outer end has fixed upon it a crank arm 28 which is connected by a link 29 to a crank arm 30 on one of the axles 12. The other rock shaft 27 extends through and is slidable in bearing openings in the side walls of the other two hoppers 14, 15 and its outer end has fixed to it a similar crank arm 31, which latter is connected by a link 32 to a crank 33 on the other axle 12. Owing to this construction, it will be seen that the movement of the ground wheels 11 will be imparted to the rock shafts 26, 27 for the purpose of oscillating them and that the two endmost hoppers 13, 15 will be adjustable longitudinally on said shafts.

The discharge openings in the bottom plates 24 of the hoppers are controlled by valve plates 34 which are pivoted intermediate their ends, as shown at 35, on the ribs 17 and having their outer ends provided with reduced pivot portions 36 which are loosely arranged in apertures in the lower ends of upright adjusting levers 37. These levers are pivoted intermediate their ends on rearwardly extending pivot pins 38 fixed to and projecting from the rear walls of the hoppers. Each of said levers is provided with an opening containing a set screw 39 which when screwed inwardly or forwardly is adapted to impinge against the upper portion of the rear wall of one of the hoppers to retain said lever in adjusted position.

For the purpose of securing the adjustable hoppers 13, 15 in adjusted position and against movement a connecting bar 40 is provided. The latter, as shown in Fig. 6, has a central opening 41 for the reception of the pivot pin 38 on the intermediate hopper 14 and adjacent its ends are longitudinal slots 42 in which latter the pivots 38 on the sliding hoppers 13, 15 are arranged. Set screws 43 are provided in openings in the connecting bar 40 adjacent its ends and they are so disposed as to impinge against the rear walls of the adjustable hoppers 13, 15 to clamp the latter against movement.

Carried by each of the hoppers is a standard 44 having a furrow opening shoe 45. The latter may be of any form and construction but as illustrated it is tapered and inclined downwardly and forwardly and has journaled on one of its sides a disk 46. The standard 44 extends through and is vertically adjustable in registering openings formed in the portions 18, 19 of the forwardly projecting arms on the hoppers. This adjustment of the standard 44 is effected by providing in it a longitudinal series of apertures 47 any one of which receives a transverse pin 48 against which bears a spring 49. The latter has its rear end fixed to the rear portion of the arm 18 and its front end apertured to receive the standard 44 so that it will tend to actuate the latter downwardly. The several standards 44 are simultaneously raised and lowered by means of cables 50 attached at their lower ends to the upper ends of said standards and having their upper ends attached to and wound upon a transverse winding shaft 51 journaled in bearings on uprights 52 rising from the connecting bars 3. At one end of the shaft 51 is fixed a ratchet wheel 53 carrying a crank handle 54 and adapted to be locked against retrograde movement by a spring actuated dog or pawl 55 pivoted to one of said uprights or standards.

56 denotes a packing roller having at its ends journals 57 arranged for rotary and sliding movement in slots 58 formed in hangers 59 depending from the inner side beams 2.

60, 61, 62 denote a pair of furrow closing scrapers arranged to travel in rear of the rollers 56, one being provided to travel in rear of each of the furrow opening shoes 45. The intermediate scraper 61 is carried by the central portion of a transverse bar 63 and the endmost scrapers 60, 62 are longitudinally adjustable on the ends of said bar 63. Each of the adjustable scrapers or coverers has fixed to it a handle member 64 the forked lower end of which straddles the bar 63 and receives one of said scrapers between it. Set screws 65 are provided in the handle bars on the members 64 for the purpose of securing them and hence the scrapers 60, 62 in adjusted position. The bar 63 is yieldably supported from the rear ends of the outer side beams 1 by means of springs 66, as more clearly shown in Fig. 4, and said bar 63 is supported and vertically adjusted by means of a hand lever 67 pivoted intermediate its ends on a bracket rising from the rear cross bar 4 and having its rear end connected by a cable or the like 68 to the central part of the bar 63. The forward or handle end of the lever 67 is provided on one side with a dog or pawl 69 adapted to engage ratchet teeth 70 provided on the standard for the driver's seat 7, as shown more clearly in Fig. 2 of the drawings.

From the foregoing it will be seen that the invention provides an exceedingly simple machine of the character described for planting one, two or three rows of cotton seed or the like and that by reason of the construction and adjustment of the various parts the rows may be planted closer to or farther from each other and the parts may be adapted for effectively operating upon different kinds and conditions of soil.

While I have shown and described in detail the preferred embodiment of my invention, it will be understood that I do not wish to be limited to the precise construction set forth since various changes in the form, proportion and arrangement of parts may be resorted to within the spirit and scope of the invention.

Having thus described the invention what is claimed is:

1. In a seed planter, the combination of a supporting frame having a guiding means, a stationary hopper on the frame, a second hopper slidably engaged with said guiding means and movable toward and from said stationary hopper, means for adjusting said slidable hopper, a ground wheel mounted in the frame, a crank actuated by said wheel, an agitator shaft mounted in bearings in said slidable and stationary hoppers, the slidable hopper being shiftable longitudinally on said agitator shaft, a crank on the outer end of said agitator shaft, and a link connecting the two cranks.

2. In a seed planter, the combination of a supporting frame having front and rear pairs of spaced transverse guide bars, hoppers slidably supported on the rear pair of bars and movable toward and from each other, hook-shaped members projecting from said hoppers and around the front pair of bars, shoes having standards projecting through and vertically slidable in said hook-shaped members and disposed between the bars of the front pair, and means for adjusting the endmost hoppers toward and from the intermediate one, and simultaneously shifting said shoes.

3. In a seed planter, the combination of a supporting frame having front and rear pairs of spaced transverse guide bars, hoppers slidably supported on the rear pair of bars and movable toward and from each other, hook-shaped members projecting from said hoppers and around the front pair of bars, shoes having standards projecting through and vertically slidable in said hook-shaped members and disposed between the bars of the front pair, an elevated winding shaft mounted in suitable bearings and disposed above said standards, and cables wound upon said shaft and connected to the upper ends of said standards.

4. In a seed planter, the combination of a supporting frame having front and rear pairs of spaced transverse guide bars, hoppers slidably supported on the rear pair of bars and movable toward and from each other, hook-shaped members projecting from said hoppers and around the front pair of bars, shoes having standards projecting through and vertically slidable in said hook-shaped members and disposed between the bars of the front pair, pins in the upper ends of said standards, leaf springs upon said hook-shaped members and adapted to bear upon said pins to move the latter downwardly, a winding shaft mounted in suitable bearings and disposed above said standards, and cables wound upon said shaft and attached to the upper ends of said standards.

5. In a seed planter, the combination of a supporting frame having front and rear pairs of spaced transverse guide bars, hoppers slidably supported on the rear pair of bars and movable toward and from each other, hook-shaped members projecting from said hoppers and around the front pair of bars, shoes having standards projecting through and vertically slidable in said hook-shaped members and disposed between the bars of the front pair, means connected to the upper ends of said standards for adjusting them vertically, means for adjusting the endmost hoppers toward the intermediate one, a transverse bar, and set screws in said bar and adapted to impinge against said endmost hoppers to retain them in adjusted position.

6. In a seed planter, the combination of a supporting frame having front and rear pairs of spaced transverse guide bars, hoppers slidably supported on the rear pair of bars and movable toward and from each other, hook-shaped members projecting from said hoppers and around the front pair of bars, shoes having standards projecting through and vertically slidable in said hook-shaped members and disposed between the bars of the front pair, supporting and drive wheels for said frame, cranks actuated by said wheels, longitudinally alined agitator shafts mounted in bearings in said hoppers, one of said shafts extending through two of the hoppers and having the endmost hopper shiftable thereon, cranks upon the outer ends of said agitator shaft, and links connecting the cranks at the sides of the machine.

7. In a seed planter, the combination of a frame, hoppers thereon and movable toward and from each other, a horizontal bar, and set screws in said bar and adapted to impinge against the endmost hoppers to retain them in adjusted position.

8. In a seed planter, the combination of a frame, hoppers arranged thereon, furrow opening shoes in advance of said hoppers, springs attached to the rear side portions of the frame and extending rearwardly, a transversely extending scraper carrying bar attached to said springs, a standard upon the frame, a seat on said standard, a ratchet upon said standard, a lever fulcrumed intermediate its ends and adapted to engage said ratchet, and a connection between one end of said lever and said scraper carrying bar.

9. In a seed planter, the combination of a frame, hoppers transversely adjustable thereon, a yieldably mounted, transversely extending bar at the rear of the frame, adjustable scrapers, upright handle members for said scrapers, said handle members having forked lower ends to straddle said bar and to receive said scraper bar between their lower extremities, and set screws in said handle members and adapted to impinge against said transverse bar to retain the scrapers in adjusted position.

In testimony whereof I hereunto affix my signature in the presence of two witnesses.

JOHN CLARK.

Witnesses:
A. W. SHINGLETON,
W. W. MAJOR.